A. White,
Governor Valve.
No. 39,979. Patented Sep. 15, 1863.
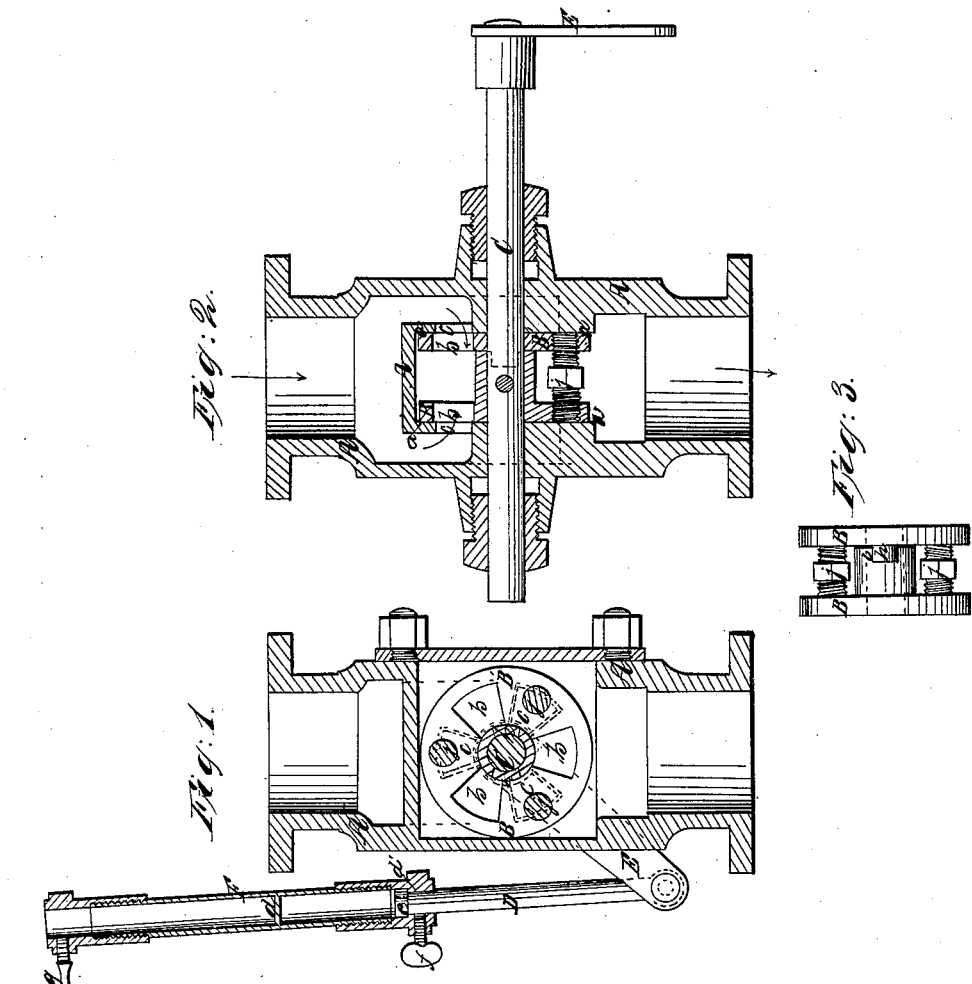

UNITED STATES PATENT OFFICE.

ALEXANDER WHITE, OF GENESEO, ILLINOIS.

IMPROVEMENT IN GOVERNOR-VALVES FOR STEAM-ENGINES.

Specification forming part of Letters Patent No. 39,979, dated September 15, 1863.

*To all whom it may concern:*

Be it known that I, ALEXANDER WHITE, of Geneseo, in the county of Henry and State of Illinois, have invented a new and useful Improvement in Regulating-Valves for Steam and other Engines; and I do hereby declare that the following is a full, clear, and exact description of the same, reference being had to the accompanying drawings, form ng part of this specification, in which—

Figures 1 and 2 are vertical sections at right angles to each other of a valve and casing illustrating my invention. Fig. 3 is a side view of the valve.

Similar letters of reference indicate corresponding parts in the several figures.

The first part of my invention relates to the construction and arrangement of the openings in a regulating-valve and its seat in such a manner that they may move in one direction from one closed position past a full opening to another closed position with less than half a revolution, the object being to provide for the shutting off of the steam in case of any accident occurring to stop the revolution of the governor; and it consists in the employment, in combination with a valve having such a system of openings, of an extensible connection between the valve and governor, operating as hereinafter described, to provide for the operation of the valve both for regulating the speed of the engine and for stopping it when the governor from any cause ceases to operate; and a second feature of my invention consists in a novel mode of combining the two disks of a double disk-valve by means of screws, whereby the faces of the disks can be adjusted to the faces of their seats and the wear of the valve and seat be compensated for.

To enable others skilled in the art to make and use my invention, I will proceed to describe its construction and operation.

A is the casing of the valve, and *a a* the seats, facing each other.

B B' is a double disk-valve, having three corresponding openings, *b b b*, in each of its disks, such openings being at equal distances apart, and having their sides radial to the axis of the spindle C and their ends concentric therewith. The spaces between the said openings are only so much wider than the openings themselves as to provide for a little lap over the sides of the openings *c c c* in the seat *a a*, which correspond in form and arrangement with the openings in the disks. This construction and arrangement of three openings in each disk and seat enables the valve to be brought from a closed condition to a full opening with one-sixth of a revolution, and to be brought from one closed position past a full opening to another closed position by one-third of a revolution.

D is a rod connected with the crank-arm E on the valve-spindle, and F is a link which forms an extensible connection between the said rod and a rod connected with the sleeve of the governor. This link is made of tubular form, and is capable of sliding on the rod D a certain distance, which is limited by stops *d d'* in the said link and a stop, *e*, on the rod, such distance being sufficient to permit the rod D to move the valve from its closed position to a wide enough opening to start the engine without moving the link.

*f* is a set-screw fitted to the link F to secure it on the rod D, and *g* is another set-screw fitted to the said link to secure it to the rod which connects it with the governor-sleeve. The operative position of the link is with the stop *d'* in contact with the stop *e*, as represented in Fig. 1. That figure represents the valve and its connection in the position they will occupy when the governor is at rest, the valve being closed.

To start the engine, the set-screw *f* is unscrewed and the rod moved upward to the stop *d'*, thereby opening the valve as far as required for that purpose. When the engine has reached a sufficient speed to impart to the governor sufficient motion to raise the balls about half-way to their desired plane of revolution, the rod D is moved down again to bring the stop *e* against the stop *d*, and the set-screw *f* screwed up tight again to connect the said rod rigidly with the link. The governor, on arriving at its proper speed, brings the arm E upward past the position in which the valve is full open, and the regulation of the engine is effected by the movement of the valve to and fro between the open position and the next closed position above that which is represented. In case of the governor ceasing to operate, the balls drop, and the sleeve brings down the link F and rod D to the position first described, and represented in the drawings.

To provide for the adjustment of the valve-disks B B' to their seats and for the refacing them whenever necessary, the hub of the valve is made of two parts, fitted together with tongues and grooves, as shown at $h\ i$ in Fig. 3, and the disks are connected by posts $j\ j$, on each of which there are a right-hand and a left-hand screw thread, one screwing into a tapped hole in one and the other into a tapped hole in the other disk. The said posts are made with squares or otherwise constructed between the screw-threads to receive a wrench or other appliance for turning them for the purpose of setting out the disks by the action of the right and left hand screw-threads in the tapped holes in the latter.

What I claim as my invention, and desire to secure by Letters Patent, is—

1. The employment, in combination with a valve having such a system of openings as hereinbefore described, of an extensible connection consisting of a link, F, or its equivalent, operating substantially as and for the purpose herein set forth.

2. Combining the two disks of a double disk-valve by means of posts $j\ j$, constructed with right and left hand screw-threads, and applied to operate substantially as herein described.

ALEXANDER WHITE.

Witnesses:
E. G. GUILD,
J. A. McCONNELL.